United States Patent [19]
Weder et al.

[11] Patent Number: 5,181,339
[45] Date of Patent: Jan. 26, 1993

[54] FLOWER POT OR FLOWER POT COVER WITH PLEATED SKIRT AND OR BASE

[75] Inventors: Donald E. Weder; Joseph G. Straeter, both of Highland, Ill.

[73] Assignee: Highland Supply Corporation, Highland, Ill.

[21] Appl. No.: 693,906

[22] Filed: May 1, 1991

Related U.S. Application Data

[60] Division of Ser. No. 397,114, Aug. 22, 1989, Pat. No. 5,029,412, which is a continuation-in-part of Ser. No. 366,588, Jun. 15, 1989, Pat. No. 5,111,613, which is a continuation-in-part of Ser. No. 219,083, Jul. 13, 1988, Pat. No. 4,897,031.

[51] Int. Cl.$^5$ .............................................. A01G 9/02
[52] U.S. Cl. ............................................. 47/72; 47/66
[58] Field of Search ....................................... 47/72, 66

[56] References Cited

U.S. PATENT DOCUMENTS

| | | |
|---|---|---|
| 1,069,675 | 8/1913 | Claussen . |
| 1,446,563 | 2/1923 | Hughes . |
| 1,610,652 | 12/1972 | Bouchard .............................. 47/72 |
| 1,697,751 | 1/1929 | Blake ................................. 47/72 |
| 2,209,778 | 7/1940 | Krasowski .......................... 47/72 |
| 2,510,120 | 6/1950 | Leander . |
| 3,962,503 | 6/1976 | Crawford ............................. 47/72 |

FOREIGN PATENT DOCUMENTS

| | | | |
|---|---|---|---|
| 2619698 | 3/1989 | France ................................ 47/72 |
| 274167 | 6/1951 | Switzerland . |

Primary Examiner—Henry E. Raduazo
Attorney, Agent, or Firm—Dunlap, Codding & Lee

[57] ABSTRACT

A flower pot or flower pot cover comprising a base and a skirt connected to an upper end of the base. The base includes a plurality of overlapping folds for providing structural integrity. The skirt includes a plurality of folds which are not connected to provide an overall pleated appearance. Portions of the folds in the skirt are connected and portions of the folds in the skirt are unconnected. In one embodiment, some of the folds in the base are connected and the remaining portions of the folds in the base are unconnected.

34 Claims, 4 Drawing Sheets

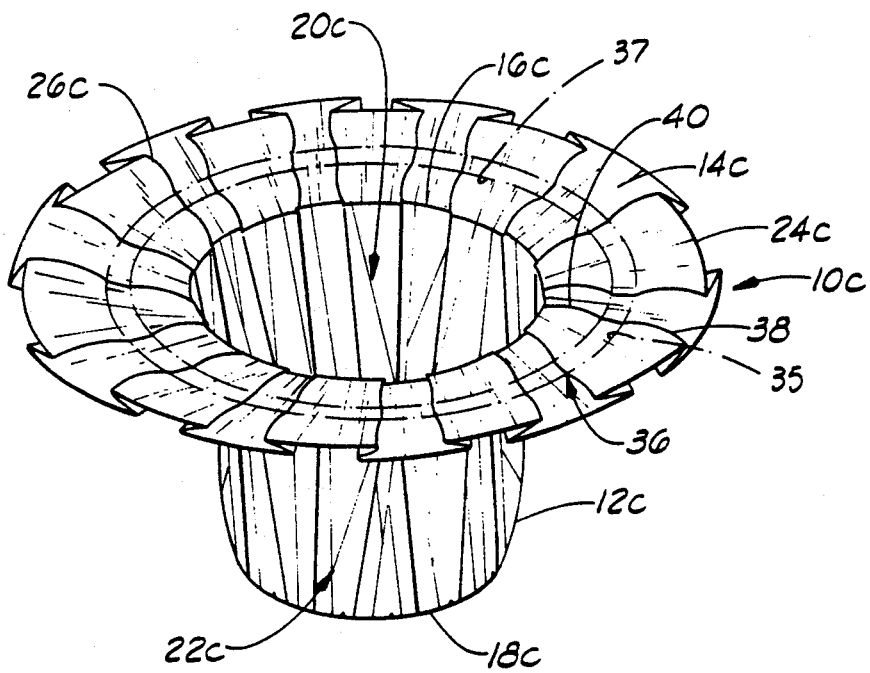
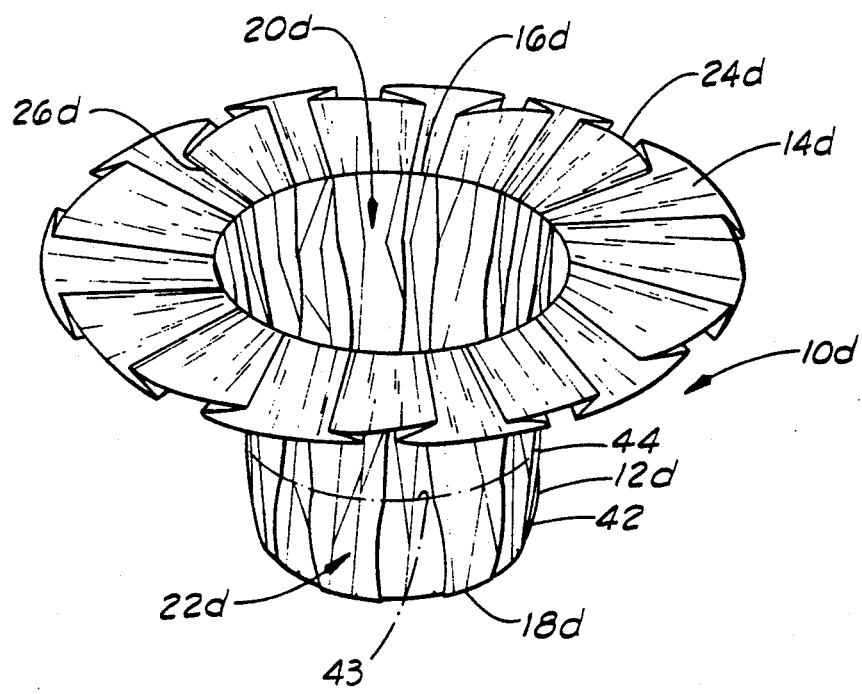

5,181,339

FLOWER POT OR FLOWER POT COVER WITH PLEATED SKIRT AND OR BASE

CROSS REFERENCE TO RELATED APPLICATIONS

This application is a division of U.S. Ser. No. 397,114, filed Aug. 22, 1989, now U.S. Pat. No. 5,029,412, entitled "Flower Pot or Flower Pot Cover with Pleated Skirt and or Base", which is a continuation-in-part of U.S. Ser. No. 366,588, filed Jun. 15, 1989, now U.S. Pat No. 5,111,613, which is a continuation-in-part of U.S. Ser. No. 219,083, filed Jul. 13, 1988, now U.S. Pat. No. 4,897,031, issued Jan. 30, 1990.

FIELD OF THE INVENTION

The present invention relates to flower pot covers or flower pots having skirts with folds in the skirt and a base with folds in the base wherein the folds in the skirt and/or in the base are selectively connected.

BRIEF DESCRIPTION OF THE DRAWINGS

FIG. 6 is a partial perspective view of a flower pot or flower pot cover with a portion of the folds in the skirt generally between the connection of the skirt to the base and the outer peripheral surface of the skirt being substantially permanently fixed.

FIG. 7 is a partial perspective view of a flower pot or flower pot cover with a portion of the folds in the base generally near the upper end of the base of being substantially permanently fixed and the remaining folds in the base being unconnected.

DESCRIPTION OF THE PREFERRED EMBODIMENTS

Figure 1:
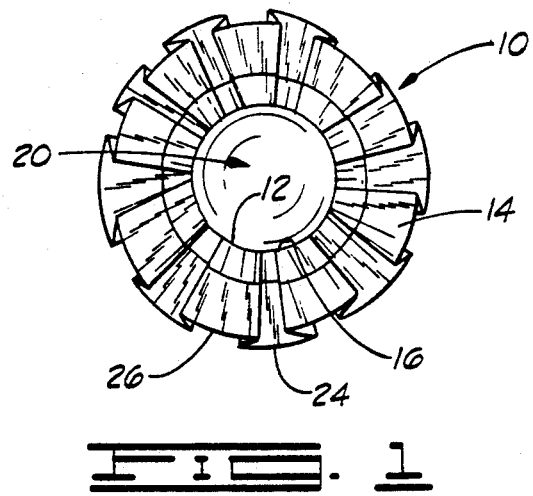
FIG. 1 is a top elevational view of the flower pot or flower pot cover constructed in accordance with the present invention.
Figure 2:
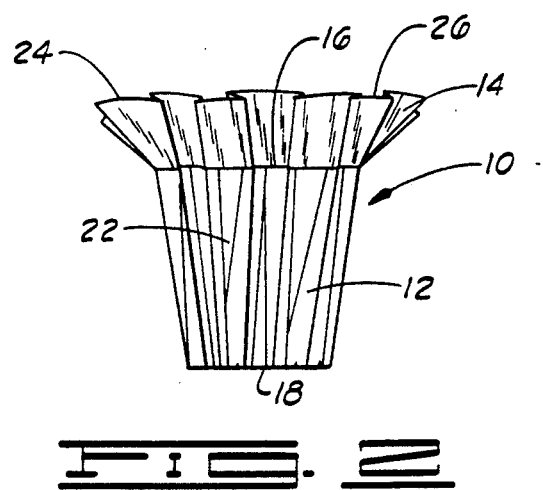
FIG. 2 is a side elevational view of the flower pot or flower pot cover of FIG. 1.
Figure 3:
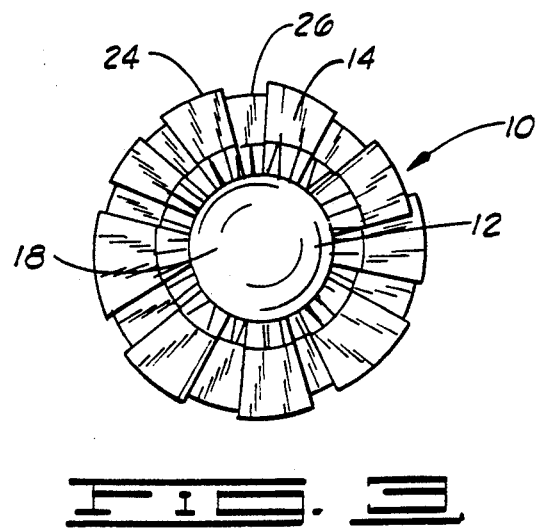
FIG. 3 is a bottom elevational view of the flower pot or flower pot cover of FIG. 1.

Shown in FIG. 1, 2 and 3 and designated therein by the reference numeral 10 is a flower pot or flower pot cover constructed in accordance with the present invention. In one embodiment, the article shown in the drawings is a flower pot cover which adapted for providing a decorative cover for a flower pot. In one other embodiment, the article shown in the drawings is a flower pot which is adapted to support floral groupings (defined below) in soil in a manner well known in the art.

The flower pot or flower pot cover 10 comprises a base 12 and a skirt 14.

The base 12 has an upper end 16 and a lower end 18. An object opening 20 (FIG. 1) is formed through the upper end 16 and the object opening 20 extends a distance through the base 12 with the base 12 substantially encompassing the object opening 20 except for the open upper end 16 of the base 12. The object opening 20 is the space substantially encompassed by the base 12.

The base 12 has a plurality of overlapping folds 22 (only one of the overlapping fold 22 being specifically designated by a reference numeral in FIG. 2) which extend at various angles and which have different and various lengths. The overlapping folds 22 in a preferred form are substantially fixed or connected. The overlapping folds 22 cooperate to provide structural integrity for maintaining the preformed shape of the base 12.

The skirt 14 is connected to the upper end 16 of the base 12. Preferably, the skirt 14 is formed integrally with the base 12. The skirt 14 extends outwardly from the upper end 16 of the base 12 terminating with an outer peripheral surface 24. A plurality of folds 26 (only one of the folds 26 being designated with a reference numeral in FIGS. 1 and 3) are formed in the skirt 14. Each of the folds 26 extends generally from the upper end 16 of the base 12 outwardly toward the outer peripheral surface 24 of the skirt 14. A substantial portion of the folds 26 are unconnected to provide an overall pleated appearance to the flower pot cover or flower pot 10.

The flower pot or flower pot cover 10 is formed by taking a sheet of material and disposing the sheet of material between a male and female mold. When the molds are brought together in mating engagement with the sheet of material therebetween the overlapping folds 22 are formed. The folds 22 can be substantially permanently connected or fixed by heat sealing the overlapping folds 22, or adhesively connecting the overlapping folds 22.

In a preferred form, the flower pot or flower pot cover 10 is preformed from a sheet of material in a manner substantially like that described in the patent entitled "Article Forming System", U.S. Pat. No. 4,773,182, issued on Sep. 27, 1988 and in the co-pending continuation patent application entitled "Article Forming System", U.S. Ser. No. 219,083, filed Jul. 13, 1988, referred to before. The disclosure in U. S. Patent 4,773,172, specifically is incorporated herein by reference.

The flower pot or flower pot cover 10 may be constructed of a material selected from a group of materials consisting of a man-made organic polymer film, paper (treated or untreated or combinations thereof), burlap, cloth (natural or synthetic or combinations thereof), denim, foil, cling wrap, or cellophane or combinations thereof.

In one preferred embodiment, the flower pot or flower pot cover 10 is constructed from a relatively thin film of substantially non-shape sustaining man-made organic polymer film. The term "man-made organic polymer film" as used herein means a man-made resin such as a polyproplyene as opposed to naturally occurring resins such as cellophane. A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping.

Additionally a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention. The flower pot or flower pot cover 10 may be constructed of a single layer of material or a plurality of layers of the same or different types of material. The flower pot or flower pot cover 10 may have any thickness. In one preferred embodiment, the flower pot or flower pot cover 10 is constructed from two polyproplyene films laminated together (a 20"×15" sheet of Mobil 270 ABW white opaque film laminated to a 20"×15" sheet of Mobil 220 AB clear film). The flower pot or flower pot cover 10 preferably has a thickness in a range of from less than about 1.0 mil to about 2.5 mils, although the thickness of the flower pot or flower pot cover 10 may be in a range from less than about 1.0 mil to about 30 mils and preferably the thickness is less than about 6 mils. The term "cling wrap" as used herein may be any material which is capable of connecting to flower pot 10 and/or itself upon contacting engagement and is wrappable about flower pot whereby portions of the cling wrap contactingly engage and connect to other portions of the cling wrap and/or the flower pot 10 for generally securing the sheet of material 32 wrapped about at least a portion of the flower pot 10. This connecting engagement is generally temporary in that the cling wrap material may be easily removed without tearing same. Preferably the cling wrap material is constructed and treated if necessary, from polyethylene such as Cling Wrap made by GladN, First Brands Corporation, Danbury, Conn. Generally, the cling wrap material will range in thickness from less than about 0.2 mils to about 10 mils, and preferably less than about 0.5 mils to about 2.5 mils and most preferably from less than about 0.6 mils to about 2 mils. However, any thickness of cling wrap material may be utilized in accordance with the present invention which permits the cling material to function as previously described.

In a preferred form, a decorative pattern is formed or printed or embossed or otherwise disposed on or incorporated in the outer peripheral surface of the flower pot or flower pot cover 10. The term "decorative pattern" as used herein means a color and/or an embossed pattern and/or other decorative surface ornamentation, including, but not limited to printed designs, coatings, flocking or metallic finishes. The flower pot or flower pot cover 10 may be constructed of a sheet of material which is totally or partially clear or tinted transparent material. It also should be noted that a decorative pattern may be incorporated on the interior surface of the base 12 formed by the object opening 20 which may be desired in some applications.

The term "floral grouping" as used herein means cut fresh flowers, artificial flowers, other fresh and/or artificial plants or other floral materials and may include other secondary plants and/or ornamentation which add to the aesthetics of the overall floral grouping.

Figure 4:
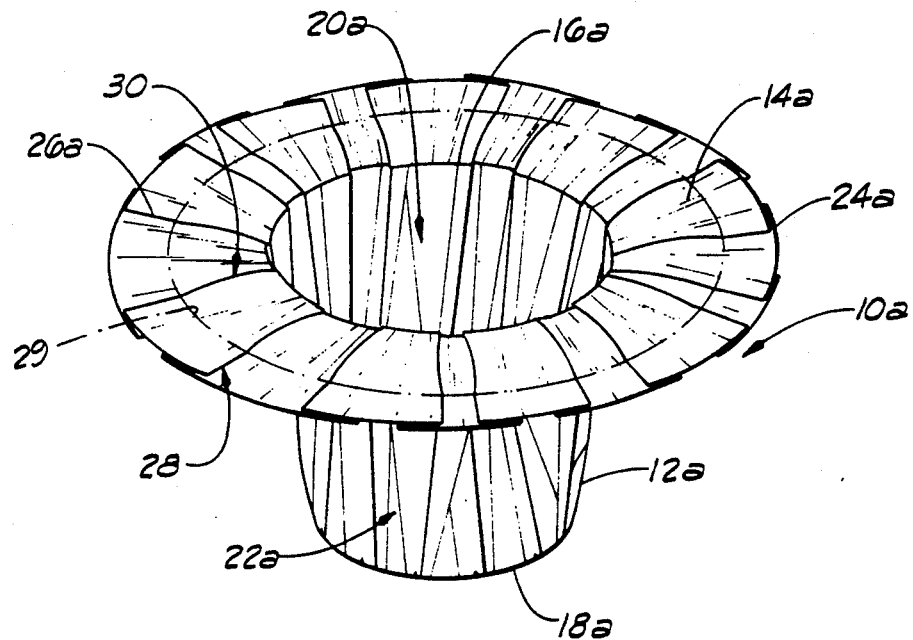
FIG. 4 is a partial perspective view of a flower pot or flower pot cover with a portion of the folds in the skirt near the outer peripheral surface of the skirt being substantially permanently fixed.

Embodiment of FIG. 4

Shown in FIG. 4 is a flower pot or flower pot cover 10a which is constructed exactly like the flower pot or flower pot cover 10 described in detail before, except a portion 28 of the folds 26a generally near and spaced a distance from the outer peripheral surface 24a of the skirt 14a are connected or substantially permanently fixed forming connected folds with said portion 28 being disposed between the outer peripheral surface 24a of the skirt 14a and a position indicated by a ling 29 in FIG. 4 spaced a distance from the outer peripheral surface 24a of the skirt 14a toward the upper end of the base 12a with said portion 29 extending circumferentially about the skirt 14a. A remaining portion 30 of the folds 26a in the skirt 14a between the upper end of the base 12a and the portion 28 having the connected folds are not connected or permanently fixed. The folds 26a in the skirt 14 which are connected or fixed may be connected or fixed by heat sealing or adhesively connecting.

Figure 5:
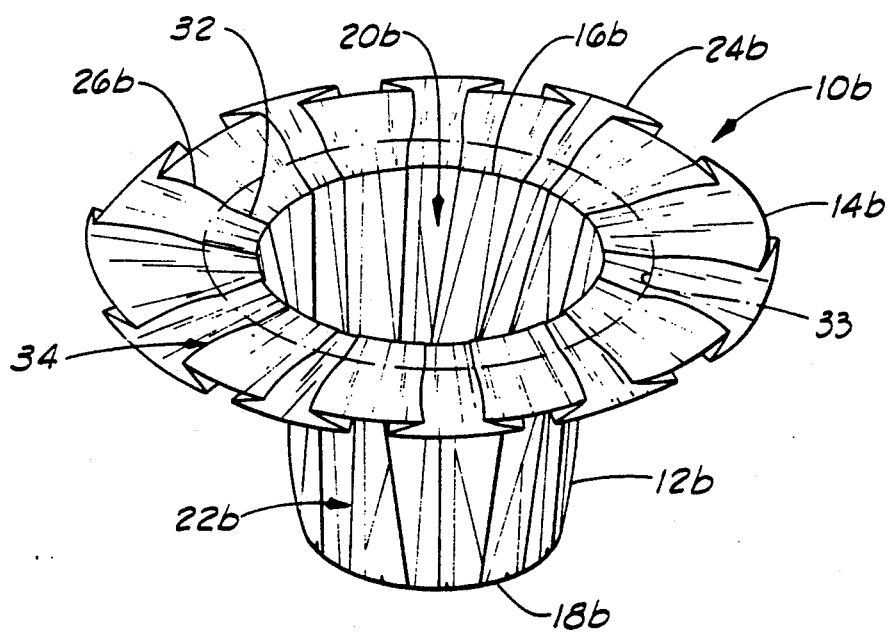
FIG. 5 is a partial perspective view of a flower pot or flower pot cover with a portion of the folds in the skirt near the connection of the skirt to base being substantially permanently fixed.

Embodiment of FIG. 5

Shown in FIG. 5 is a flower pot or flower pot cover 10b Which is constructed exactly like the flower pot or flower pot cover 10 described in detail before, except a portion 32 of the folds 26b generally near and extending a distance from the connection of the skirt 14b to the upper end 16b of the base 12b are connected or substantially permanently fixed, said portion 32 being disposed between the upper end of the base 12b and a position indicated via a line 33 in FIG. 5 spaced a distance from the touter peripheral surface of the skirt 14b forming connected folds with said portion 32 extending circumferentially about the skirt 14b. A remaining portion 34 of the folds 26b in the skirt 14b are not connected or permanently fixed, said portion 34 is being disposed between the outer peripheral surface 24b of the skirt 14b and the portion 32 with the connected folds.

Embodiment of FIG. 6

Shown in FIG. 6 is a flower pot or flower pot cover 10c which is constructed exactly like the flower pot or flower pot cover 10 described in detail before, except a portion 36 of the folds 26c at a position generally between the outer peripheral surface 24c and the connection of the skirt 14c to the upper end 16c of the base 12c are connected or substantially permanently fixed forming connected folds with said portion 36 having the connected folds extending circumferentially about the skirt 14c and with the dead portion 36 being disposed generally between lines 35 and 37 in FIG. 6. A remaining 38 of the folds 26c generally between the outer peripheral surface 24c and the portion 36 are not connected or substantially permanently fixed, said remaining portion 38 extending circumferentially about the skirt 14c. Another remaining portion 40 of the folds 26c generally between the connection of the skirt 14c to the upper end 16c of the base 12c and the portion 36 are not connected or substantially permanently fixed, said remaining portion 40 extending circumferentially about the skirt 14c.

The portions 28, 32 and 36 shown in FIGS. 4, 5 and 6, respectively, can be combined with each or some of the portions 28, 32 and 36 and the portions 28, 32 and 36 may extend only a partial distance circumferentially about the skirt 14c.

Embodiment of FIG. 7

Shown in FIG. 7 is a flower pot or flower pot cover 10 10d which is constructed exactly like the flower pot or flower pot cover 10 described in detail before, except a portion 42 of the folds 22d in the base 12d generally near the lower end 18d and extending a distance therefrom are not substantially permanently fixed or connected said portion 42 being disposed between the lower end 18d and a line 43 in FIG. 7 and said portion 42 extending circumferentially about the base 12d. A remaining portion 44 of the folds 22d in the base 12d are substantially permanently fixed or connected said remaining portion 44 extending between the line 43 and the upper end 16d of the base 12d and said remaining portion 44 extending circumferentially about the base 12d.

Figure 8:
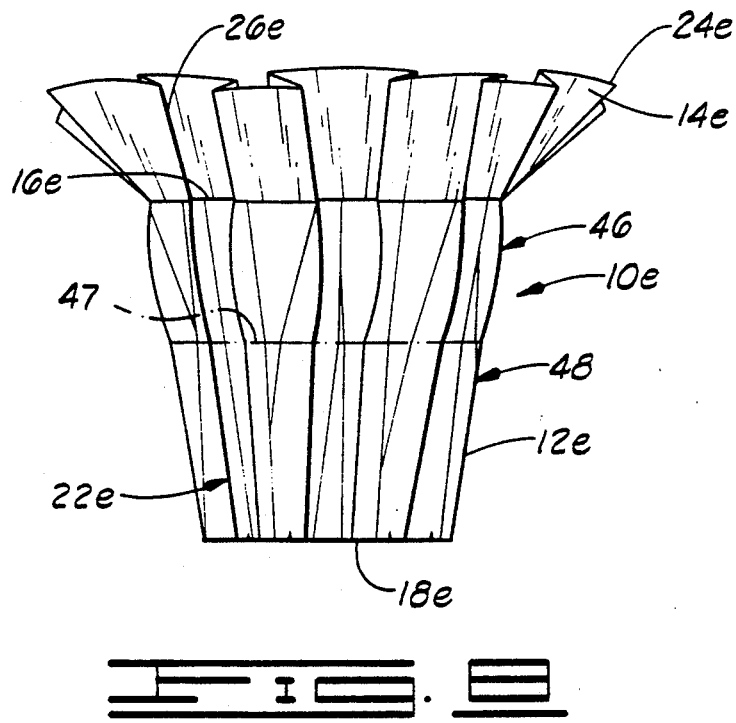
FIG. 8 is a side elevational view of a flower pot or flower pot cover with the folds in the base generally near the lower end being substantially permanently fixed and the folds in the base generally near the upper end being substantially unconnected.

Embodiment of FIG. 8

Shown in FIG. 8 is a flower pot or flower pot cover 10e which is constructed exactly like the flower pot or flower pot cover 10 described in detail before, except a portion 48 of the folds 22e and the base 12e disposed between the lower end 18e of the base 12e and a position indicated by a line 47 in FIG. 8 and spaced a distance from the lower end 18e of the base 12e toward the upper end 16e of the base 12e are permanently fixed or connected. A remaining portion 46 of the folds 22e in the base 12e between the upper end 16e and the portion 48 with the connected folds are unconnected or not substantially permanently fixed or connected. The portions 46 and 48 each extends circumferentially about the base 12e.

Figure 9:
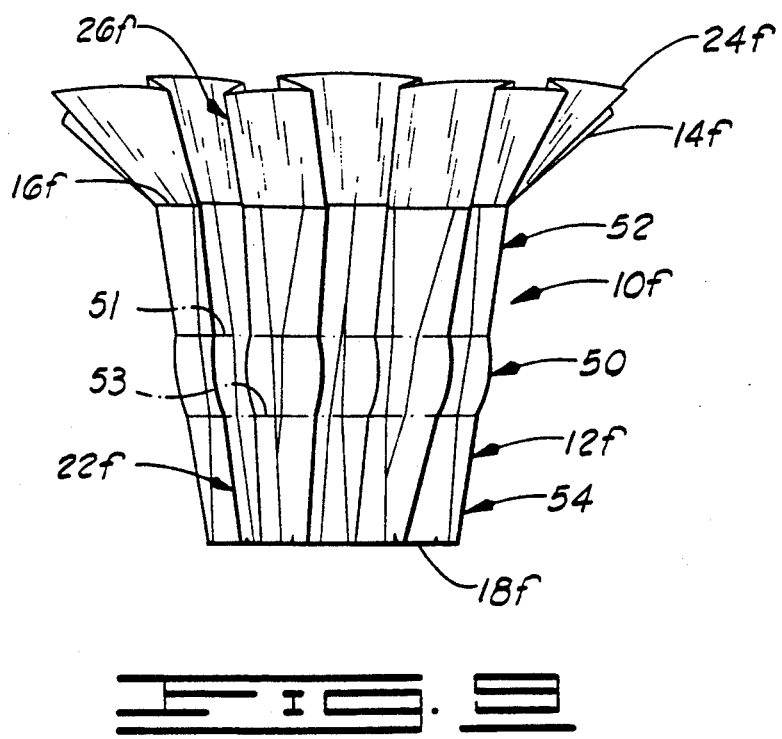
FIG. 9 is a side elevational view of a flower pot or flower pot cover with folds in the base wherein the folds in the base generally near the upper end and generally near the lower end thereof are substantially permanently fixed and the folds at an intermediate position generally between the upper and the lower end portions of the base are substantially unconnected.

Embodiment of FIG. 9

Shown in FIG. 9 is a flower pot or flower pot cover 10f which is constructed exactly like the flower pot or flower pot cover 10 described in detail before, except a portion 50 of the folds 22f generally between the upper and lower ends 16f 18f are not connected or permanently fixed, said portion 50 being disposed generally between lines 51 and 53 in FIG. 9 and said portion 50 extending circumferentially about the base 12f. A remaining portion 52 of the folds 22f generally between the portion 50 and the upper end 16f are substantially permanently connected or fixed said remaining portion 52 extending circumferentially about the base 12f and said remaining portion 52 extending generally between the upper end 16f of the base 12f and the portion 50. Another remaining portion 54 generally between the portion 50 and the lower end 18f are substantially permanently connected or fixed, said remaining portion 54 extending circumferentially about the base 12f and said remaining portion 54 extending generally between the lower end 18f of the base 12f and the portion 50.

Changes may be made in the construction of the flower pot or flower pot cover 10 as described herein and changes may be made in the steps or the sequence of steps of the methods described herein without departing from the spirit and scope of the invention as defined in the following claims.

What is claimed is:

1. A flower pot or flower pot cover, comprising:
    a base having an upper end and a lower end with an object opening extending through the upper end and having a plurality of overlapping folds formed in the base for cooperating to provide structural integrity to the base; and
    a skirt connected to the upper end of the base and extending a distance outwardly from the upper end of the base terminating with an outer peripheral surface, the skirt having a plurality of folds extending from about the upper end of the base outwardly to the outer peripheral surface of the skirt, a portion of the folds in the skirt between a position near the upper end of the base and spaced a distance from the outer peripheral surface of the skirt toward the upper end of the base being permanently connected forming connected folds with said portion having the connected folds extending circumferentially about the skirt, and a remaining portion of the folds between the outer peripheral surface of the skirt and said portion with the connected folds being unconnected with said remaining portion extending circumferentially about the skirt.

2. The flower pot or flower pot cover of claim 1 wherein the overlapping folds in the base substantially are permanently connected.

3. The flower pot or flower pot cover of claim 1 wherein the flower pot cover is constructed of a material selected from a group of materials consisting of a man-made organic polymer film, paper, (treated or untreated or combinations thereof), burlap, cloth (natural or synthetic or combinations thereof), denim, foil, cling wrap, or cellophane or combinations thereof.

4. The flower pot or flower pot cover of claim 1 wherein the base and the skirt each are defined further as having a thickness in a range from less than about 1.0 mil to about 30 mils.

5. The flower pot or flower pot cover of claim 1 wherein the base and the skirt each are defined further as having a thickness of less than about 6 mils.

6. The flower pot or flower pot cover of claim 1 wherein the folds in the skirt are shaped to provide an overall pleated appearance.

7. A flower pot or flower pot cover, comprising:
    a base having an upper end and a lower end with an object opening extending through the upper end and having a plurality of overlapping folds formed in the base for cooperating to provide structural integrity to the base; and
    a skirt connected to the upper end of the base and extending a distance outwardly therefrom terminating with an outer peripheral surface, the skirt having a plurality of folds extending from about the upper end of the base outwardly to the outer peripheral surface of the skirt, a portion of the folds in the skirt between the outer peripheral surface of the skirt and a position spaced a distance from the outer peripheral surface of the skirt toward the upper end of the base being permanently connected forming connected folds with said portion having the connected folds extending circumferentially about the skirt, and the remaining portion of the folds between the upper end of the base and said portion having the connected folds being unconnected with said remaining portion extending circumferentially about the skirt.

8. The flower pot or flower pot cover of claim 7 wherein the flower pot cover is constructed of a material selected from a group of materials consisting of a man-made organic polymer film, paper, (treated or untreated or combinations thereof), burlap, cloth (natural or synthetic or combinations thereof), denim, foil, cling wrap, or cellophane or combinations thereof.

9. The flower pot or flower pot cover of claim 7 wherein the base and the skirt each are defined further as having a thickness in a range from less than about 1.0 mil to about 30 mils.

10. The flower pot cover of claim 7 wherein the base and the skirt each are defined further as having a thickness of less than about 6 mils.

11. The flower pot or flower pot cover of claim 7 wherein the folds in the skirt are shaped to provide an overall pleated appearance.

12. A flower pot or flower pot cover, comprising:
a base having an upper end and a lower end with an object opening extending through the upper end and having a plurality of overlapping folds formed in the base for cooperating to provide structural integrity to the base; and
a skirt connected to the upper end of the base and extending a distance outwardly therefrom terminating with an outer peripheral surface, a plurality of folds being formed in the skirt extending from about the upper end of the base outwardly toward the outer peripheral surface of the skirt, a portion of the folds in the skirt generally between the outer peripheral surface and the connection of the skirt to the upper end of the base being connected, forming connected folds with said portion having the connected folds extending circumferentially about the skirt, and a remaining portion of the folds between the outer peripheral surface of the skirt and the portion having the connected folds being unconnected, with said remaining portion extending circumferentially about the skirt, and another remaining portion of the folds between the portion having the connected folds and the connection of the skirt to the upper end of the base being unconnected with said another remaining portion extending circumferentially about the skirt.

13. The flower pot or flower pot cover of claim 12 wherein the flower pot cover is constructed of a material selected from a group of materials consisting of a man-made organic polymer film, paper, (treated or untreated or combinations thereof), burlap, cloth (natural or synthetic or combinations thereof), denim, foil, cling wrap, or cellophane or combinations thereof.

14. The flower pot or flower pot cover of claim 12 wherein the base and the skirt each are defined further as having a thickness in a range from less than about 1.0 mil to about 30 mils.

15. The flower pot or flower pot cover of claim 12 wherein the base and the skirt each are defined further as having a thickness of less than about 6 mils.

16. The flower pot or flower pot cover of claim 12 wherein the folds in the skirt are shaped to provide an overall pleated appearance.

17. A flower pot or flower pot cover, comprising:
a base having an upper end and a lower end with an object opening extending through the upper end and having a plurality of overlapping folds formed in the base for cooperating to provide structural integrity to the base, a portion of the folds in the base between the lower end of the base and a position spaced a distance from the lower end of the base toward the upper end of the base being permanently connected with said portion extending circumferentially about the base, forming conected folds and a remaining portion of the folds in the base between the upper end of the base and said poriton with the connected folds being unconnected, said remaining portion extending circumfertially about the base.

18. The flower pot or flower pot cover of claim 17 further comprising:
a skirt connected to the upper end of the base and extending a outwardly from the upper end of the base terminating with an outer peripheral surface, the skirt having a plurality of folds extending from about the upper end of the base outwardly toward the outer peripheral surface of the skirt.

19. The flower pot or flower pot cover of claim 18 wherein the folds in the skirt are shaped to provide an overall pleated appearance.

20. The flower pot or flower pot cover of claim 17 wherein the overlapping folds in the base substantially are permanently fixed.

21. The flower pot or flower pot cover of claim 17 wherein the flower pot cover is constructed of a material selected from a group of materials consisting of a man-made organic polymer film, paper, (treated or untreated or combinations thereof), burlap, cloth (natural or synthetic or combinations thereof), denim, foil, cling wrap, or cellophane or combinations thereof.

22. The flower pot or flower pot cover of claim 17 wherein the base and the skirt each are defined further as having a thickness in a range from less than about 1.0 mil to about 30 mils.

23. The flower pot or flower pot cover of claim 17 wherein the base and the skirt each are defined further as having a thickness of less than about 6 mils.

24. The flower pot or flower pot cover, comprising:
a base having an upper end and a lower end with an object opening extending through the upper end and having a plurality of overlapping folds formed in the base for cooperating to provide structural integrity to the base, a portion of the folds in the base between the upper end of the base and a position spaced a distance from the upper end of the base being permanently connected forming connected folds with said portion having connected folds extending circumferentially about the base forming connected folds and a remaining portion of the folds in the base between the lower end of the base and said portion of the base with the connected folds being unconnected, said remaining portion extending circumferentially about the base.

25. The flower pot or flower pot cover of claim 23 further comprising:
a skirt connected to the upper end of the base and extending a outwardly from the upper end of the base terminating with an outer peripheral surface, the skirt having a plurality of folds extending from about the upper end of the base outwardly toward the outer peripheral surface of the skirt.

26. The flower pot of claim 23 wherein the flower pot cover is constructed of a material selected from a group of materials consisting of a man-made organic polymer film, paper, (treated or untreated or combinations thereof), burlap, cloth (natural or synthetic or combinations thereof), denim, foil, cling wrap, or cellophane or combinations thereof.

27. The flower pot of claim 23 wherein the base and the skirt each are defined further as having a thickness in a range from less than about 1.0 mil to about 30 mils.

28. The flower pot of claim 23 wherein the base and the skirt each are defined further as having a thickness of less than about 6 mils.

29. A flower pot or flower pot cover comprising:
a base having an upper end and a lower end with an object opening extending through the upper end and having a plurality of overlapping folds in the base for corporating to provide structural integrity to the base, a portion of the folds in the base between the upper and the lower ends of the base being connected forming connected folds with said portion having the connected folds extending circumferentially about the base, and a remaining portion of the folds in the base between the upper end of the base and said portion having the connected folds in the base being unconnected and said remaining portion extending circumferentially about the base, and another remaining portion of the folds in the base between the portion with the connected folds and the lower ends of the base being unconnected and extending circumferentially about the base.

30. The flower pot or flower pot cover of claim 29 further comprising:
a skirt connected to the upper end of the base and extending a outwardly from the upper end of the base terminating with an outer peripheral surface, the skirt having a plurality of folds extending from about the upper end of the base outwardly toward the outer peripheral surface of the skirt.

31. The flower pot or flower pot cover of claim 29 wherein the folds in the skirt are shaped to provide an overall pleated appearance.

32. The flower pot cover of claim 29 wherein the flower pot cover is constructed of a material selected from a group of materials consisting of a man-made organic polymer film, paper, (treated or untreated or combinations thereof), burlap, cloth (natural or synthetic or combinations thereof), denim, foil, cling wrap, or cellophane or combinations thereof.

33. The flower pot cover of claim 29 wherein the base and the skirt each are defined further as having a thickness in a range from less than about 1.0 mil to about 30 mils.

34. The flower pot cover of claim 29 wherein the base and the skirt each are defined further as having a thickness of less than about 6 mils.

* * * * *

UNITED STATES PATENT AND TRADEMARK OFFICE
CERTIFICATE OF CORRECTION

PATENT NO. : 5,181,339

DATED : January 26, 1993

INVENTOR(S) : Donald E. Weder, Joseph G. Straeter

It is certified that error appears in the above-identified patent and that said Letters Patent is hereby corrected as shown below:

Column 1, Line 67; after which, please insert --is--.

Column 3, Line 20, matter of format: please start new paragraph with sentence starting 'The flower pot or...'.

Column 3, Line 35; matter of format: please start new paragraph with sentence starting 'The term...'.

Column 4, Line 18; after by a, please delete "ling" and substitute therefore --line--.

Column 4, Line 26; after skirt, please delete "14" and substitute therefore --14a--.

UNITED STATES PATENT AND TRADEMARK OFFICE
CERTIFICATE OF CORRECTION

PATENT NO. : 5,181,339

DATED : January 26, 1993

INVENTOR(S) : Donald E. Weder, Joseph G. Straeter

It is certified that error appears in the above-identified patent and that said Letters Patent is hereby corrected as shown below:

Column 5, Line 20, after connected, please insert --,--.

Column 5, Line 28; after 10e, please insert a space.

Column 5, Line 46; after 16f, please insert --and--.

Column 5, Line 52; after fixed, please insert --,--.

Column 8, Line 57; after extending, please delete "a".

UNITED STATES PATENT AND TRADEMARK OFFICE
CERTIFICATE OF CORRECTION

PATENT NO. : 5,181,339

DATED : January 26, 1993

INVENTOR(S) : Donald E. Weder, Joseph G. Straeter

It is certified that error appears in the above-identified patent and that said Letters Patent is hereby corrected as shown below:

Column 4, Line 33, after 10b, please delete "Which" and substitute therefore --which--.

Column 4, Line 41; after the, please delete "touter" and substitute therefore --outer--.

Column 4, Line 45; after 34, please delete "is".

Column 5, Line 15; after connected, please insert --,--.

UNITED STATES PATENT AND TRADEMARK OFFICE
CERTIFICATE OF CORRECTION

PATENT NO. : 5,181,339

DATED : January 26, 1993

INVENTOR(S) : Donald E. Weder, Joseph G. Straeter

It is certified that error appears in the above-identified patent and that said Letters Patent is hereby corrected as shown below:

Column 9, Line 11, after for, please delete "corporating" and substitute therefore --cooperating--.

Column 10, Line 4; after extending, please delete "a".

Signed and Sealed this

Thirtieth Day of November, 1993

Attest:

BRUCE LEHMAN

*Attesting Officer*  *Commissioner of Patents and Trademarks*